April 10, 1962  W. S. GLEESON  3,028,850
VALVE SEAT INSERT
Filed April 22, 1959  2 Sheets-Sheet 1

Inventor
William S. Gleeson
by *Hill, Sherman, Meroni, Gross & Simpson* Attys.

Inventor
William S. Gleeson

United States Patent Office 3,028,850
Patented Apr. 10, 1962

---

3,028,850
VALVE SEAT INSERT
William S. Gleeson, Euclid, Ohio, assignor to Thompson Ramo Wooldridge Inc., Cleveland, Ohio, a corporation of Ohio
Filed Apr. 22, 1959, Ser. No. 808,041
5 Claims. (Cl. 123—188)

The present invention relates broadly to the poppet valve art, and is more particularly concerned with a valve seat insert the expansion of which is controlled whereby under varying engine operating conditions a predetermined interference is maintained between said insert and the engine operating structure therefor.

Valve seat inserts are employed under particular engine conditions by reason of their relatively high resistance to corrosion, hot hardness characteristics, and their ability to extend the life of the cylinder head or block, especially when the engine casting is formed of aluminum or other materials having an inherent softness. Numerous problems, however, arise from use of seat inserts and these problems for the present purposes may be grouped broadly into those related to the effect of the insert upon valve operating temperatures and the problem of assuring that the insert will continuously remain seated in the engine head or block under both hot and cold engine operating conditions.

First, the temperatures throughout the valve head, and particularly at the valve face, are substantially increased when seat inserts are utilized. This is largely due to an impairment in heat transfer which occurs at the junction between the seat insert and the block or head material. Optimum heat transfer would require essentially molecular contact, similar to a welded or brazed joint, and this is not practical under production conditions. The press fit installation is most frequently used, particularly in original equipment production, because of ease of assembly and cost. Where a field service problem is encountered, a screw-in type may be used, especially if loosening is the problem. As is known, the high valve operating temperatures arising from the use of inserts are compensated for by using premium valve base steels, and alloy facings thereon.

Nevertheless, the presence of seat deposits, high temperatures and high corrosion resistance necessitates in many applications the use of hard seat inserts. An insert, however, which becomes improperly seated during installation frequently causes valve distortion since the valve head deflects to accommodate itself to the seat, and this gives rise to bending stresses in the stem. While in certain situations gas pressures and spring loads are generally sufficient to bring the head into conformity with a seat which is only mildly distorted, under other circumstances valve leakage and subsequent valve burning occur.

It has been the prior art practice to make the circular ring insert of slightly larger diameter, generally 0.002 to 0.003", and then force the insert into place in the relatively smaller counterbore diameter. There is accordingly provided an initial interference or nominal press fit. The further prior art practice, in order to assure maintenance of this press fit during the cycle of engine operation, is to match the coefficient of expansion of the valve seat insert with the coefficient of expansion of the engine head or block in which the insert is to be seated. This has been for the reason that if the rate of expansion of the insert is less than that of the head or block, the insert loosens as temperature increases, during engine operation. On the other hand, if the expansion rate of the insert is greater than that of the cylinder head material, a cracking of the insert occurs when it is not constructed of a material having sufficient strength. Stated otherwise, it has been believed necessary to form the insert of a high alloy content metal in order to match as closely as possible the relative coefficients of expansion of the insert and the engine head or block material.

A higher alloyed material can also be desirable in order to obtain higher hot hardness and/or corrosion resistance. These materials do not match the coefficient of thermal expansion of the engine block material because of the difference in average operating temperature and alloy content. Past practice has been to overcome these large differences in rates of thermal expansion by altering the degree of press fit. In order to initially maintain the insert in the machined groove in the head or block, the nominal press fit of about 0.003 was utilized. However, during hot engine operation the seat insert expands substantially and the compressive stresses on the insert are correspondingly increased until the creep limit is reached. As engine operation continues, the effective press fit decreases because of a reduction in the internal stresses of the seat insert. When the engine cools down, however, the seat insert will shrink to the same degree that it expanded and if creep is severe enough the seat insert will become loose in the counterbore. If the initial press fit is increased to prevent loosening under this condition, it is entirely possible for the compressive stress to reach a high enough value during warm-up to crack the insert. Thereafter, when the engine structure and insert cool, the insert shrinks and thus becomes loose in the counterbored groove. In some installations, essentially the only answer to this problem is to resort to peening or some mechanical means of locking the insert so that slippage to the point of improper seating is reduced.

Applicant has discovered, however, after determining that the valve seat insert is exposed to substantially higher temperatures than the engine block or head, that the alloy content of the insert material may be substantially lowered and a coefficient of thermal expansion substantially lower than that previously employed may be utilized. More specifically, in accordance with the teachings of this invention, low alloy irons are deliberately selected for the seat insert material which have a lower coefficient of expansion than heretofore deemed operative, and there is matched the product of the coefficient of expansion of the insert and its temperature change with the product of the coefficient of expansion of the material in which insert is seated and the temperature change of said material. It is apparent that the temperature differential between the cylinder head material and the seat insert is significant and should be known in order to correctly select materials. Thereby the insert is under both hot and cold engine operating conditions maintained in place, without subjecting the insert to deformation beyond the maximum compressive stress or its creep strength. And as may be otherwise stated, the interference, including the initial interference, plus the mean temperature rise of the seat multiplied by the coefficient of expansion of the seat, less the mean temperature rise of the engine head or block times the coefficient of expansion of the head or block should at all times be less than the interference at which creep begins, and more than a zero fit. Under these conditions, the seat does not drop out of the engine part, and further, the seat insert is not damaged even when the engine operates at its maximum temperature.

It is accordingly a primary aim of the present invention to provide a valve seat insert the expansion of which is controlled whereby under varying engine operating conditions a predetermined interference fit is maintained between said insert and the engine supporting structure therefor.

Another object of the invention lies in the provision of a valve seat insert of low alloy content, which may be shaped by powder metallurgy techniques at substantial cost savings over the earlier structures.

Still another object of this invention is to provide a valve seat insert composed of a metal having a coefficient of expansion such that the product of its coefficient of expansion times the temperature change of the insert is substantially equal to the product of the coefficient of expansion of the material in which it is seated times the temperature change of said material.

Other objects and advantages of the invention will become more apparent during the course of the following description, particularly when taken in connection with the accompanying drawings.

In the drawings, wherein like numerals are employed to designate like parts throughout the same:

Figure 1:
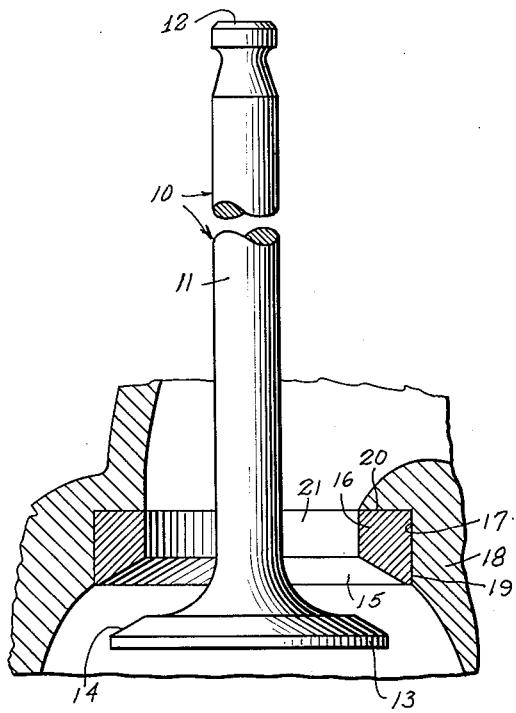
FIGURE 1 is a side elevational view of a valve in open position relative to an engine part provided with a seat insert constructed in accordance with the principles of this invention.

A valve of conventional configuration is shown in FIGURE 1 and designated therein by the numeral 10. The valve is constructed to include a stem portion 11 connecting at one end with a tip portion 12 and at the opposite end with a head portion 13. The head portion is beveled at 14 to provide a sealing surface area when the valve is in closed position against a corresponding sealing surface 15 provided on an annular seat insert held by a suitable press fit in a counterbored groove 17 in an engine part 18, which may be either a cylinder head or cylinder block. The outer diameter 19 of the insert 16 is slightly greater than the diameter of the counterbore 17 to provide a nominal press-fit of about 0.003". It is thus to be seen that when the insert 16 is installed in the position of FIGURE 1 an initial press load is exerted thereon, and the insert is essentially surrounded by the engine part 18 along its outer diameter 19 and along surface 20 thereof. It is to be further seen that the engine part 18 is shaped internally along the path of axial travel of the valve stem 11 whereby the insert 16 has an inner diameter 21 flush with the downstream portions of the engine part or head.

It has been the prior art practice to install a valve seat insert essentially as described in the preceding paragraph with reference to the insert 16 of FIGURE 1, utilizing an initial press-fit of about 0.002 to 0.003" constructed of an alloy having a coefficient of expansion closely matching that of the engine head upon the theory that thereby the insert would have the desired interference during both hot and cold engine operation. As for example, there has been proposed and used with aluminum cylinder heads and blocks a valve seat insert of an iron base alloy having essentially a 15% by weight nickel content and an analysis normally within the range of 1.25 to 2.50% carbon, 5.5 to 7.5% copper, 13.0 to 16.0% nickel, 1.0 to 1.5% manganese, 2.1 to 3.0% chromium, 2.1 to 3.0% silicon, and the balance essentially iron. An alloy of this composition has a hardness of about 24 to 30 $R_c$, and a rate of thermal expansion of $10.7 \times 10^{-6}$ in./in./° F. The coefficient of expansion of aluminum is $15.4 \times 10^{-6}$ in./in./° F., and it is to be seen that the thermal expansion of the alloy having the composition range above set forth rather closely matches or compares favorably with the coefficient of expansion of aluminum.

Figure 3:
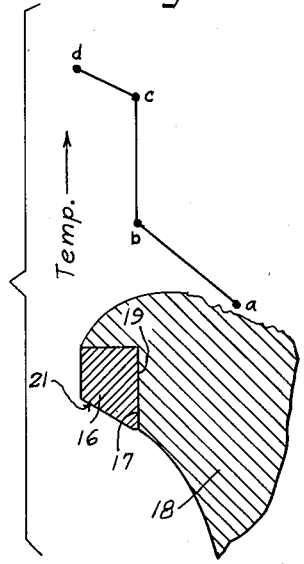
FIGURE 3 is a view graphically correlating the relative temperatures encountered by various portions of the engine head and seat insert therein.

However, while this prior art alloy has a hardness which makes it suitable for valve insert applications, experience has demonstrated that the use of a high alloy content material having a coefficient of expansion calculated to match as closely as practical the thermal expansion of the head or block material is actually productive of a loosening of the insert after maximum engine temperatures are reached, and in particular circumstances may even give rise to essentially a destruction of the insert. To explain with reference now to FIGURE 3, it has been found that during the cycle of engine operation the valve seat insert is heated to a temperature substantially greater than that of the cylinder head or block and accordingly experiences a relatively greater thermal expansion. In FIGURE 3 the legend $a$ designates a temperature representative of that encountered in the engine part 18 outwardly of the counterbore 17 therein, the legend $b$ designates the temperature at said counterbore 17, the letter $c$ designates a temperature commonly encountered along the outer diameter 19 of the insert 16, and the legend $d$ represents the temperature found generally along the face 21 of the insert 16.

While the temperatures found at the points designated will of course vary in different engines operated under varying conditions and utilizing particular head and insert materials, by way of illustration typical temperatures at the locations $a$, $b$, $c$, and $d$ may be 250° F., 490° F., 610° F. and 655° F., respectively. The relative difference in temperatures between the points $b$ and $c$ in FIGURE 3 is largely attributable to the impairment in heat transfer between the outer diameter 19 of the insert 16 and the inner diameter 17 of the head 18. As earlier noted, improved heat transfer could be effected by a welded or brazed joint, however, this is clearly not expedient in a production operation. Further, as was also stated hereinabove, a screw-in type installation upon occasion reduces the problem of loosening of the insert, but in such an installation the heat transfer between the insert and head is markedly inferior to that obtained from a press-fitted insert.

Figure 2:
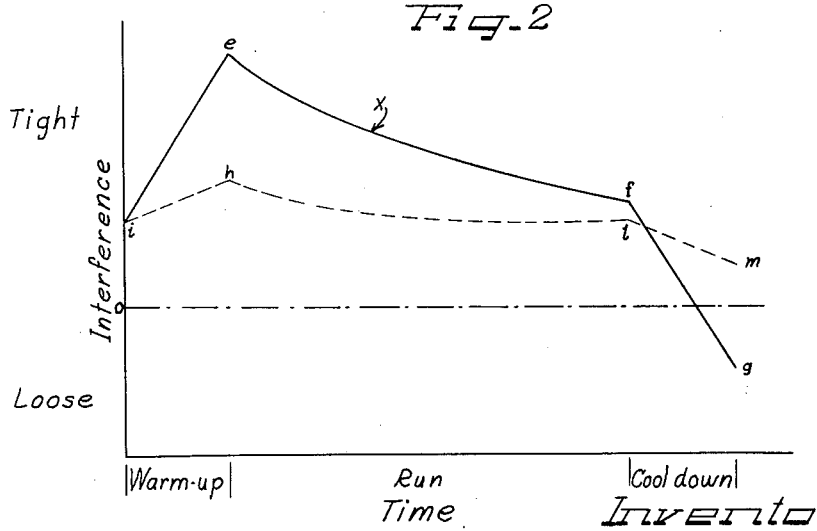
FIGURE 2 is a graphical representation comparing the interference or press-fit loads to which conventional inserts and the inserts of this invention are subjected throughout the time of an essentially complete engine cycle.

The substantially higher temperatures to which the insert is raised after the engine is started, as contrasted with the engine head or block temperatures during the same period gives rise to a markedly greater expansion of the insert, and when the relative coefficients of expansion of the insert and head are essentially matched, the insert is subjected to high compressive stresses at maximum engine temperatures, with the result that a permanent set of the insert is frequently produced or a high compressive stress is imposed to crack the seat insert. Accordingly, after the engine has been stopped and the parts thereof cooled, the insert has a loose or zero or even minus press-fit. This is shown in FIGURE 2, which is graphical representation of the interference or press-fit loads encountered by an insert during time of engine operation, the line X designating the conventional insert and the line Y the insert of this invention.

The dashed-dot line parallel to the abscissa represents a zero press-fit or interference of the insert with respect to the engine head, and as is the customary practice in the art, the insert is initially located in the counterbore of the head with an initial press-fit load as obtained when the outer diameter of the insert ring is about 0.003" greater than the inner diameter of the head. This is designated in FIGURE 2 along the ordinate by legend $i$.

During the start up time of the engine the conventional insert is subjected to ever increasing loads by reason of relatively greater expansion caused by the higher temperature conditions to which the insert is exposed relative to the engine head or block. This is shown by the relatively steep line which proceeds upwardly to the point designated by the legend $e$, representative of the interference or press-fit load to which the insert is subjected under maximum engine temperatures. This substantial interference, caused by an essential matching of coefficients of expansion of the insert and head, introduces high compressive stresses in the insert causing creep. During continued engine operation at maximum temperature the interference or press-fit load gradually diminishes to the point represented by the letter $f$, which is essentially the interference after creep at maximum temperatures. Since the conventional insert has reached the point $e$ at which creep begins, the line $e$—$f$ is generally representative of the load condition during which the insert has a permanent set by having reached the point at which creep begins. Upon engine cooling, the interference drops substantially by reason of the shrinkage or contraction of the parts, until the final point $g$ is reached, representative of the press-fit load under cool conditions after creep.

It is to be seen, however, that the load represented by the point $g$ is at least zero, and in many instances is actually a minus interference. In either event, the insert has lost its pressed-fit and is loose relative to the head counterbore. The best practice has been to increase the interference fit ($i$) to a higher value resulting in a greater interference at ($e$) which considerably increases the compressive stress. It is highly possible that the increased stress can be greater than the ultimate strength of the material. In this case, cracking of the insert is usually encountered with the possible end result of the insert coming loose during engine operation.

Loosening of the valve seat insert and the likelihood of valve distortion caused thereby through overheating are herein avoided by utilization of an insert composed of a metal having a coefficient of expansion such that the product of its coefficient of expansion and temperature change of the insert is substantially equal to the product of the coefficient of expansion of the material in which it is seated and the temperature change of said material. An insert as thus constructed has at all times an interference which is less than the interference at which creep begins because of over-stressing, and which is at all times greater than a zero fit. Referring again to FIGURE 2, and particularly to line Y therein, an insert embodying the principles of this invention is located in the counterbore of the cylinder head or block with a press-fit load essentially the same as that utilized with the conventional insert. Specifically, a nominal press-fit of about 0.003″ is preferred, and this load is designated in FIGURE 2 by the same legend $i$. By closely relating, however, the expansion of the insert and its temperatures change with the same properties of the head or block, the expansion of the insert never reaches the point at which sufficient compressive stresses are imposed therein to initiate severe creep. The maximum press-fit load on the insert of this invention is represented in FIGURE 2 by the legend $h$, and it is to be seen that the present insert proceeds through a much more gradual interference during the engine starting and subsequent thereto. In addition, it is to be noted that the press-fit load remains relatively constant throughout engine operation, to the point designated by the legend $l$. Thereafter, after the engine has been stopped and the parts cooled, the final press-fit load is essentially the same as the initial load $i$, as represented in FIGURE 2, by the legend $m$.

It is thus to be seen that by carefully relating the product of insert thermal expansion and temperature change with the product of material thermal expansion and temperature change the expansion of the present insert is maintained well below the point $e$ at which excessive creep begins, for the conventional material, and accordingly, the insert is not subjected to a permanent set whereby upon cooling and shrinkage of the insert and loosening of the insert with respect to the head counterbore occurs.

The manner in which these novel results are obtained will be set forth in connection with a composition particularly adapted for use with aluminum cylinder heads and cylinder blocks. It will be appreciated, however, that the principles of this invention apply to other insert compositions and to engine part materials of cast iron and other ferrous and non-ferrous metals.

A preferred composition for use with aluminum cylinder heads and blocks is of low alloy content since it is not desired to match the relative coefficients of expansion of the insert and head, as was considered necessary by the prior art teachings. An iron base is herein utilized, and there is added about 0.75 to 1.0% carbon for hardness and strength, and approximately 1.75 to 2.25% copper in order to minimize porosity arising from use of powder metallurgy techniques as preferred herein. While the compositions stated provide most satisfactory results in many applications, it may be found desirable to add 0.25 to 0.50% nickel and/or manganese for strength reasons, and about 0.50 to 1.0% molybdenum to improve the ductility of the alloy.

A preferred method of forming the valve seat insert of this invention is to compact the iron-carbon-copper powder to the desired shape under hydraulic pressure, and to then sinter the compact thus formed at approximately 2100° F. in a reducing atmosphere to chemically lock the particles together. The sintered part is thereafter heat treated utilizing a cycle to provide a hardness within the range of 24 to 30 $R_c$. Tests thereon have shown that the sintered iron insert has a coefficient of expansion of $6.62 \times 10^{-6}$ in./in.° F.

Figure 4:
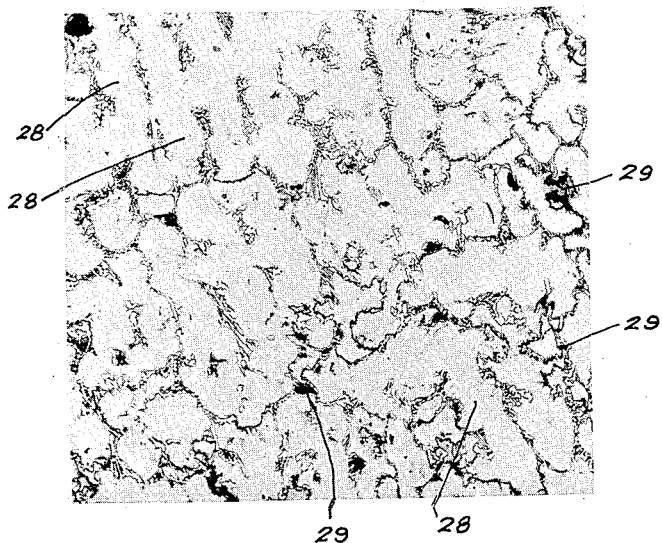
FIGURE 4 is a photoreproduction of the metallurgical structure of a known valve seat insert material.
Figure 5:
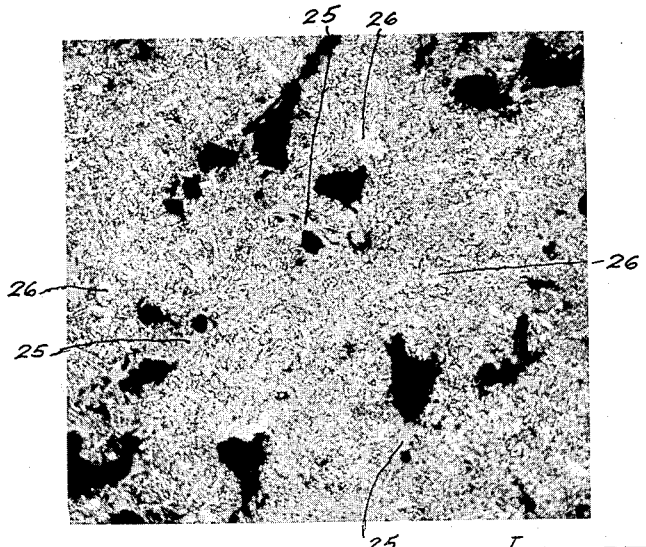
FIGURE 5 is a photoreproduction of the metallurgical structure of an exemplary alloy for valve seat insert use embodying the teachings of this invention.

In FIGURE 5 there is shown a photomicrograph (500 ×) of the metallurgical structure of the alloy of this invention, and it will be noted therefrom that the structure is predominantly martensitic with a random disperson of copper inclusions 25 and free ferrite 26. The conventional insert alloy, on the other hand, has the microstructure illustrated in FIGURE 4. At the same magnification as in FIGURE 5, the structure of the known alloy is a composite of dendrites 28 in an austenitic matrix, the dendrites being surrounded by pearlite type entectoids 29. The microstructures of the known alloy and the instant alloy are thus to be seen to be substantially different.

Engine tests have been conducted utilizing both the earlier noted essentially 15% nickel-iron base alloy and the alloy of this invention in aluminum cylinder blocks. It was found that each alloy had comparable corrosion and burning resistance, while the present alloy actually had a seat insert wear rate averaging only 0.0036″ per hundred hours, as compared with a wear rate of 0.0058″ per hundred hours for the conventionally employed 15% nickel alloy. However, the greatest contribution provided by this invention is in the elimination of any tendency on the part of the insert to become loosened in its seating surface. In exhaustive investigations performed to date, there was no measurable insert movement throughout the complete cycle of hot and cold engine operation.

The prior art technique of forming valve seat inserts has been to employ a composition as earlier noted, and to cast the shape using conventional foundry techniques, and then machining the cast shape on all surfaces to the final dimensional size required to provide an initial press-fit. Applicant, however, substantially down-grades the alloy content and obtains the desired shape by powder metallurgy techniques to provide an insert shape which is dimensionally precise with the exception of the outer diameter and the seal area with the engine head or block. These machining steps are readily accomplished, and it has thus far been found that cost savings of at least 40% are effected by following the present teachings.

It is to be seen from the foregoing that applicant has provided a valve seat insert the expansion of which is such that under varying engine operating conditions a predetermined interference is maintained between said insert and the engine supporting structure therefor. The maximum interference or press-fit load is at all times equal to the initial interference plus temperature change of the seat times the coefficient of expansion of the seat minus the temperature change of the cylinder head or block multiplied by the coefficient of expansion of said head or block. In addition, the maximum interference to which the insert is subjected is always less than the interference at which excessive creep begins, and further, is always greater than a zero press-fit.

It is to be understood that various modifications may be effected in the articles and techniques herein disclosed without departing from the novel concepts of the present invention.

I claim as my invention:

1. A valve seat insert for insertion in the counterbore around an engine valve port composed of a metal having a rate of thermal expansion such that the product of its rate of thermal expansion and mean temperature change is substantially equal to the product of the coefficient of expansion and mean temperature change of the material defining the counterbore in which said insert is seated, whereby loosening of the insert with respect to said material defining the counterbore is essentially avoided.

2. A valve seat insert composed of a metal having a rate of thermal expansion such that the maximum interference to which the insert is subjected during engine operation is substantially equal to the initial interference plus the product of the temperature change and coefficient of expansion of the insert minus the product of the temperature change and rate of thermal expansion of the material in which the insert is seated, whereby loosening of the insert with respect to said material is essentially avoided.

3. A valve seat insert formed of an iron base sintered metal body containing 0.75 to 1.0% carbon, 1.75 to 2.25% copper and having a nickel content less than 5.0% by weight and having a rate of thermal expansion such that the product of its rate of thermal expansion and temperature change is substantially equal to the product of the coefficient of expansion and temperature change of the material in which said insert is seated, whereby loosening of the insert with respect to said material is essentially avoided.

4. A method of preventing loosening of a valve seat insert with respect to an engine body part, which comprises determining the coefficient of expansion of the body part and the temperature changes to which said body part and insert are subjected during use, and constructing said body part and insert of materials such that the product of the rate of thermal expansion and temperature change of the insert is substantially equal to the product of the coefficient of expansion and temperature change of the body.

5. In an engine having a body part and a valve seat insert therein, said body part and insert being constructed of materials such that the product of the rate of thermal expansion and temperature change of the insert is substantially equal to the product of the coefficient of expansion and temperature change of the body, whereby loosening of the insert with respect to the body part is essentially avoided.

References Cited in the file of this patent
UNITED STATES PATENTS

| | | |
|---|---|---|
| 1,911,173 | Colewell | May 23, 1933 |
| 2,017,154 | Larkin | Oct. 15, 1935 |
| 2,064,155 | Fahrenwald | Dec. 15, 1936 |
| 2,092,283 | McCarroll | Sept. 7, 1937 |
| 2,142,781 | Frevert et al. | Jan. 3, 1939 |
| 2,240,202 | Anselmi | Apr. 29, 1941 |
| 2,457,861 | Brassert | Jan. 4, 1949 |
| 2,771,667 | Sunden | Nov. 27, 1956 |
| 2,800,122 | Howell | July 23, 1957 |